United States Patent
Doyle et al.

(10) Patent No.: US 12,258,020 B2
(45) Date of Patent: Mar. 25, 2025

(54) INTELLIGENT ADVANCED ENGINE BRAKING SYSTEM

(71) Applicant: INTERNATIONAL BUSINESS MACHINES CORPORATION, Armonk, NY (US)

(72) Inventors: Matthew Doyle, Chatfield, MN (US); John R. Dangler, Rochester, MN (US); Layne A. Berge, Rochester, MN (US); Jason J. Bjorgaard, Rochester, MN (US); Matthew A. Walther, Rochester, MN (US); Kyle Schoneck, Rochester, MN (US); Thomas W. Liang, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 201 days.

(21) Appl. No.: 17/444,916

(22) Filed: Aug. 12, 2021

(65) Prior Publication Data

US 2023/0052436 A1 Feb. 16, 2023

(51) Int. Cl.
*B60W 30/18* (2012.01)
*B60W 10/06* (2006.01)
(Continued)

(52) U.S. Cl.
CPC ...... *B60W 30/18136* (2013.01); *B60W 10/06* (2013.01); *B60W 10/18* (2013.01);
(Continued)

(58) Field of Classification Search
CPC ........... B60W 30/18136; B60W 10/06; B60W 10/18; B60W 40/06; B60W 2556/45;
(Continued)

(56) References Cited

U.S. PATENT DOCUMENTS

| 7,608,014 B2 | 10/2009 | Kobiki |
| 8,958,964 B2 | 2/2015 | Cunningham |

(Continued)

FOREIGN PATENT DOCUMENTS

| CN | 101039828 A | 9/2007 |
| CN | 105620475 A | 6/2016 |

(Continued)

OTHER PUBLICATIONS

Machine Translation of JP2021095011A PDF File Name: "JP2021095011A_Machine_Translation.pdf".*

(Continued)

*Primary Examiner* — Grant Moubry
*Assistant Examiner* — Ruben Picon-Feliciano
(74) *Attorney, Agent, or Firm* — Andre L. Adkins (57) ABSTRACT

A system and method for slowing a vehicle. Road conditions around the vehicle are monitored, and determined if those road conditions are hazardous. An engine control unit is informed of the hazardous road conditions and alters the operation of the engine control unit in response to the hazardous road conditions. When an operator of the vehicle desires to slow the vehicle down, an indication is received indicating the intent to slow the vehicle down. The vehicle is then slowed based upon the altered operation of the engine control unit by applying a vacuum to increase a manifold vacuum of the engine.

19 Claims, 5 Drawing Sheets

(51) Int. Cl.
 *B60W 10/18* (2012.01)
 *B60W 40/06* (2012.01)
(52) U.S. Cl.
 CPC ..... *B60W 40/06* (2013.01); *B60W 2510/0623* (2013.01); *B60W 2510/0671* (2013.01); *B60W 2540/10* (2013.01); *B60W 2556/45* (2020.02)
(58) Field of Classification Search
 CPC . B60W 2510/0623; B60W 2510/0671; B60W 2540/10
 See application file for complete search history.

(56) References Cited

U.S. PATENT DOCUMENTS

| | | | |
|---|---|---|---|
| 9,719,224 | B2 | 8/2017 | Borges |
| 9,815,325 | B2 | 11/2017 | Howard |
| 10,227,064 | B2 | 3/2019 | Serra |
| 2003/0230279 | A1* | 12/2003 | Burkhard ............ F02D 13/0226 123/90.15 |
| 2013/0140878 | A1 | 6/2013 | Yang |
| 2019/0025857 | A1* | 1/2019 | Luckevich ........... G05D 1/0295 |
| 2019/0217884 | A1* | 7/2019 | Siddiqui .............. B62D 5/0481 |
| 2019/0283741 | A1 | 9/2019 | Toda |
| 2019/0360380 | A1* | 11/2019 | Dudar ...................... F01P 7/14 |
| 2020/0174261 | A1* | 6/2020 | Uenohara ................ B60R 1/00 |
| 2020/0263621 | A1 | 8/2020 | Khafagy |
| 2020/0386193 | A1* | 12/2020 | Dudar .................... F02B 37/18 |
| 2022/0055645 | A1 | 2/2022 | Oba |

FOREIGN PATENT DOCUMENTS

| | | | | |
|---|---|---|---|---|
| CN | 104228834 | B | | 8/2016 |
| CN | 111572545 | A | | 8/2020 |
| CN | 111674401 | A | | 9/2020 |
| CN | 110271541 | A | | 7/2022 |
| JP | 2021095011 | A | * | 6/2021 |
| WO | WO-2020205597 | A1 | * | 10/2020 ............ B60W 40/09 |

OTHER PUBLICATIONS

"What Is Engine Braking and Can It Harm Your Car?" REDEX, Sep. 25, 2017, www.holtsauto.com/redex/news/what-is-engine-braking-and-can-it-harm-your-car/#when. Retrieved from the internet on Aug. 9, 2021.

Bowman, Dave. "How Do ABS Brakes Work in the Ice Snow?" ITSTILLRUNS, itstillruns.com/history-abs-brakes-5042665.html. Retrieved from internet on Aug. 9, 2021.

Viramgama, Dhaval. "Intelligent Vehicle Safety Technology: Anti-Lock Braking System (ABS) and Its Advancements." International Research Journal of Engineering and Technology (IRJET), vol. 06, No. 09, Sep. 2019, pp. 1158-1168., doi:https://www.irjet.net/archives/V6/I9/IRJET-V6I9176.pdf. Retrieved from internet on Aug. 9, 2021.

International Application PCT/CN2022/107373, Notification of Transmittal of International Search Report and Written Opinion, mailed Oct. 20, 2022 (9 pages).

\* cited by examiner

INTELLIGENT ADVANCED ENGINE BRAKING SYSTEM

BACKGROUND

The present disclosure relates to controlling a vehicle while braking, and more specifically to controlling a vehicle while braking when hazardous road conditions are present.

Vehicles travel the roads around the world. Weather and road conditions change constantly. Some of these road conditions can make it difficult to slow the vehicle down in a manner that allows the driver to maintain control of the vehicle. The development of anti-lock braking systems have aided in the ability to maintain control of a vehicle, and improve automotive safety.

SUMMARY

Embodiments of the present disclosure are directed to an engine braking system for a vehicle. The system includes an internal combustion engine and an engine control unit that controls the engine. A transmission is connected to the engine to transfer the rotational energy of the engine to the wheels of the vehicle. A braking system is present to inhibit the rotation of the wheels using mechanical approaches. An external road condition detector is present to detect road conditions and determine if those conditions are hazardous. The vehicle is augmented with a vacuum system that is connected to the engine that increases the engine manifold vacuum during the operation of the engine in response to detected hazardous road conditions.

Embodiments of the present disclosure are directed to a computer implemented process for slowing a vehicle. The process monitors road conditions around the vehicle, and determines if those road conditions are hazardous. If the process determines that the road conditions are hazardous it informs an engine control unit of the hazardous road conditions. It further alters operation of the engine control unit in response to the hazardous road conditions. When the operator of the vehicle desires to slow the vehicle down, an indication is received indicating the intent to slow the vehicle down. The process then slows the vehicle based upon the altered operation of the engine control unit by applying a vacuum to increase a manifold vacuum of the engine.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relates to controlling a vehicle while braking, and more specifically to controlling a vehicle while braking when hazardous road conditions are present. While the present disclosure is not necessarily limited to such applications, various aspects of the disclosure may be appreciated through a discussion of various examples using this context.

Vehicles travel the roads around the world carrying passengers and cargo. Weather and road conditions change constantly. Some of these road conditions, such as snow, ice, and rain, can make it difficult to slow the vehicle down in a manner that allows the driver to maintain control of the vehicle. While anti-lock braking systems have aided in the ability to maintain control of a vehicle, they are not always the most effective. Anti-lock braking systems often times result in an increased stopping distance on certain road conditions. This is because of the on/off nature of the application of the brakes in the vehicle. This increases stopping distance is observed most often on snow or ice covered surfaces. The increased stopping distance may result in additional and avoidable collisions. These collisions account for millions of dollars each year in damage to both vehicles and cargo that are damage as a result of a collision. Therefore, a system to augment the anti-lock braking systems to both assist in maintaining control of the vehicle and shortening the stopping distances can result in safer transport of both persons and cargo.

Figure 1:
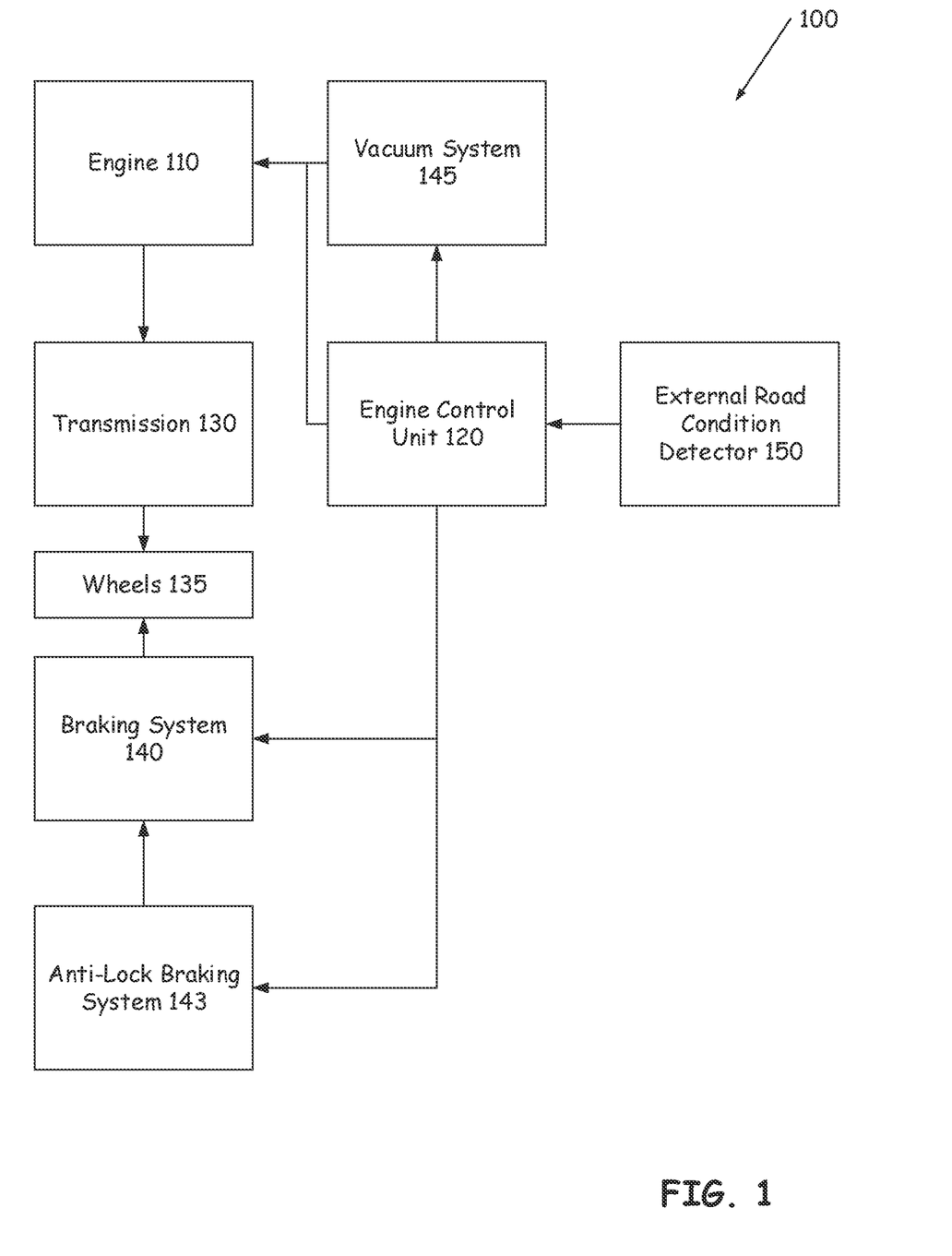
FIG. 1 is a block diagram of a content delivery system according to embodiments.

FIG. 1 is a block diagram illustrating components of an intelligent engine braking system 100 according to various embodiments of the present disclosure. The system 100 as installed in a vehicle includes an engine 110, an engine control unit 120, a transmission 130, a braking system 140, and an external road condition detector 150.

The engine 110 is a component of the system 100 that provides propulsive power to the vehicle. The engine 110 is an internal combustion engine 110 that uses gasoline, diesel, or natural gas as a fuel to provide combustion inside the engine 110. The engine 110 has one or more cylinders that compress the fuel prior to ignition of the fuel by either an applied spark or through compression of the fuel. Fuel is injected into the engine 110 through the use of one or more fuel injectors associated with each of the cylinders present. The rate at which fuel is provided to the engine 110 through the fuel injectors determines the rate at which the cylinders cycle through their stages. In one embodiment the engine 110 is a four stroke engine 110. In a four stroke engine 110 a complete cycle of the combustion process for the cylinder occurs in four stages; an intake stage where fuel and air are mixed, a compression stage where the fuel air mixture is compressed by the piston, a power stage where the fuel air mixture is combusted and pushes the piston down, and an exhaust stage where the gasses from the combustion are pushed out of the cylinder. As the piston moves through each stage it interacts with the crankshaft through the connecting rod to generate rotational power.

The engine control unit 120 is a component of the system 100 that controls the functioning of the engine 110 and the components associated with the engine 110. The engine control unit 120 controls, in response to, the actuation of the accelerator pedal the amount of fuel that is provided to the engine 110. The engine control unit 120 also controls other functions and features of the engine 110, such as valve timing or turning off various cylinders of the engine 110 to conserve fuel. The engine control unit 120 also can control the vacuum system 145 of the present disclosure.

The transmission 130 is a component of the system 100 that transfers the rotational power from the engine 110 to the wheels and tires 135 of the vehicle thus allowing the vehicle to move. The transmission 130 adapts the output of the engine 110 to the drive wheels. As the engine 110 operates at a relatively high rotational speed compared to the rotational speed of the drive wheels at low speeds (e.g. 700 RPM for the engine vs less than 10 RPM for the wheels), the transmission 130 reduces the higher engine speed to the slower wheel speed, increasing torque in the process through the use of one or more gears. Likewise, at high speeds the reverse can be true. That is that the wheel speed is relatively higher than the engine speed. The transmission 130 in this case raises the lower engine speed to match the higher wheel speed. The transmission 130 can switch between the gears or the gear ratio as the speed of the vehicle changes. The gears allow the transmission 130 to match the engine speed to the wheel speed. Further some gears can change the directional rotation of the wheels, thus allowing forward and reverse motion.

The transmission 130 generally is connected to the engine 110 crankshaft via for example a flywheel, a clutch, or fluid coupling. The output of the transmission 130 is transmitted via the driveshaft to one or more differentials, which drive the wheels.

The braking system 140 is a component of the system 100 that inhibits the rotation of the wheels by absorbing energy from the wheels to slow or stop the vehicle. The braking system 140 applies friction to a portion of the wheel to transfer the rotational energy into another form of energy. Typically, the application of a brake pad to a rotor generates heat as a result of the friction. However, in some approaches added resistance such as through a regenerative braking system 140 can be used to provide the braking action. The braking system 140 can be augmented by an anti-lock braking system 143.

The anti-lock braking system 143 is an automated system that applies the principles of threshold braking and cadence braking to help slow the vehicle while allowing the driver to maintain control of the vehicle without causing the wheels to lock up. Anti-lock braking (ABS) systems allow for improved vehicle control and decreased stopping distances on dry and some slippery surfaces. However, on loose gravel or snow-covered surfaces anti-lock braking systems significantly increase braking distance. This increased stopping distance can cause the vehicle to impact an object (e.g. another vehicle or a person) while still allowing the driver to have steering control. However, on some surfaces, such as ice, the anti-lock braking system 143 can be defeated if all the wheels upon which the anti-lock braking system 143 is active cease to rotate. This cessation of rotation causes the anti-lock braking system 143 to believe the vehicle has stopped moving, despite the fact that the vehicle is still sliding.

To augment the anti-lock braking system 143 in these and other situations, the braking system 140 further includes an engine braking system. The engine braking system uses the resistance of the engine 110 to help slow the vehicle down as well as to reduce wear on the brake pads and/or drums and rotors. The engine braking system is employed by the vehicle in conjunction with the anti-lock braking system 143 as an additional brake when specific road conditions are detected or certain braking actions are detected. Unlike a typical engine braking system, the engine braking system includes vacuum augmentation that allows this system to be employed on a wider variety of vehicles, such as passenger automobiles or light/medium duty trucks and vans.

The vacuum system 145 is a component of the braking system 140 that allows for the increase in the manifold vacuum of the engine 110 at engine speeds that are above idle speed. In an internal combustion engine 110, the manifold vacuum is highest when the engine 110 is at idle and gradually reduces as the engine speed increases to higher RPMs. By increasing the manifold vacuum the system is able to replicate the internal conditions that are present when the engine 110 is at idle. To increase the manifold vacuum, a vacuum pump is connected to the engine 110 intake. When the vacuum pump is activated, the manifold vacuum increases which causes the engine 110 to work harder to maintain the same engine power and rotational speed. However, as no additional fuel is supplied to the engine there is no additional power available to counteract the effects of the increased vacuum pressure. This increased workload demand causes the engine 110 to slow which in turn causes the vehicle to slow down as well, without the application of any of the mechanical brakes on the vehicle.

The external road condition detector 150 is a component of the system that detects road conditions in and around the vehicle. The detector 150 can use a variety of sensors that are attached to the vehicle to determine the conditions of the road. For example, the detector 150 can use cameras that are mounted around the vehicle, such as backup cameras or cameras in the mirrors, to identify the conditions of the road. For example, if the road surface appeared white in the images, the detector 150 can determine that the road is covered with snow. Other sensors such as temperature sensors and vehicle stability control sensors can be used to determine the outside environment and the reaction of the vehicle. Additional information about the road conditions can be obtained by the detector 150. For example, information from a local government's traffic monitoring system can be obtained and used by the detector 150 to assist in determining the road conditions. Other information such as from traffic cameras, web cams, snowplow cams, GPS, other vehicles, etc. can be used to help identify areas that have road conditions that could be a concern for maintaining safe and stable driving. This information can be received via a network or other connection, such as a cellular network, a Wi-Fi network, mobile phone, etc.

When the detector 150 determines that a hazardous road condition such as snow or ice is present, the detector 150 communicates this information to the engine control unit 120 so that the vacuum system 145 can be controlled to assist in slowing the vehicle down when needed. For example, when the driver of the vehicle releases the accelerator pedal, the engine control unit 120 can increase the manifold vacuum to further increase the effects of releasing the accelerator pedal. This causes the vehicle to slow more dramatically than would be possible by adjusting the fuel to the engine 110. By slowing the vehicle without the use of the brakes, the driver maintains greater control of the vehicle than they would by applying the brakes, and can considerably shorten the stopping distance required in the hazardous conditions. In some embodiments, the detector 150 can inform the anti-lock braking system 143 of the hazardous road conditions as well. The ABS system can react by delaying the application of the brakes or altering the way that the ABS system is applied to the vehicle to further assist in maintain control of the vehicle and shortening the stopping distance.

Figure 2:
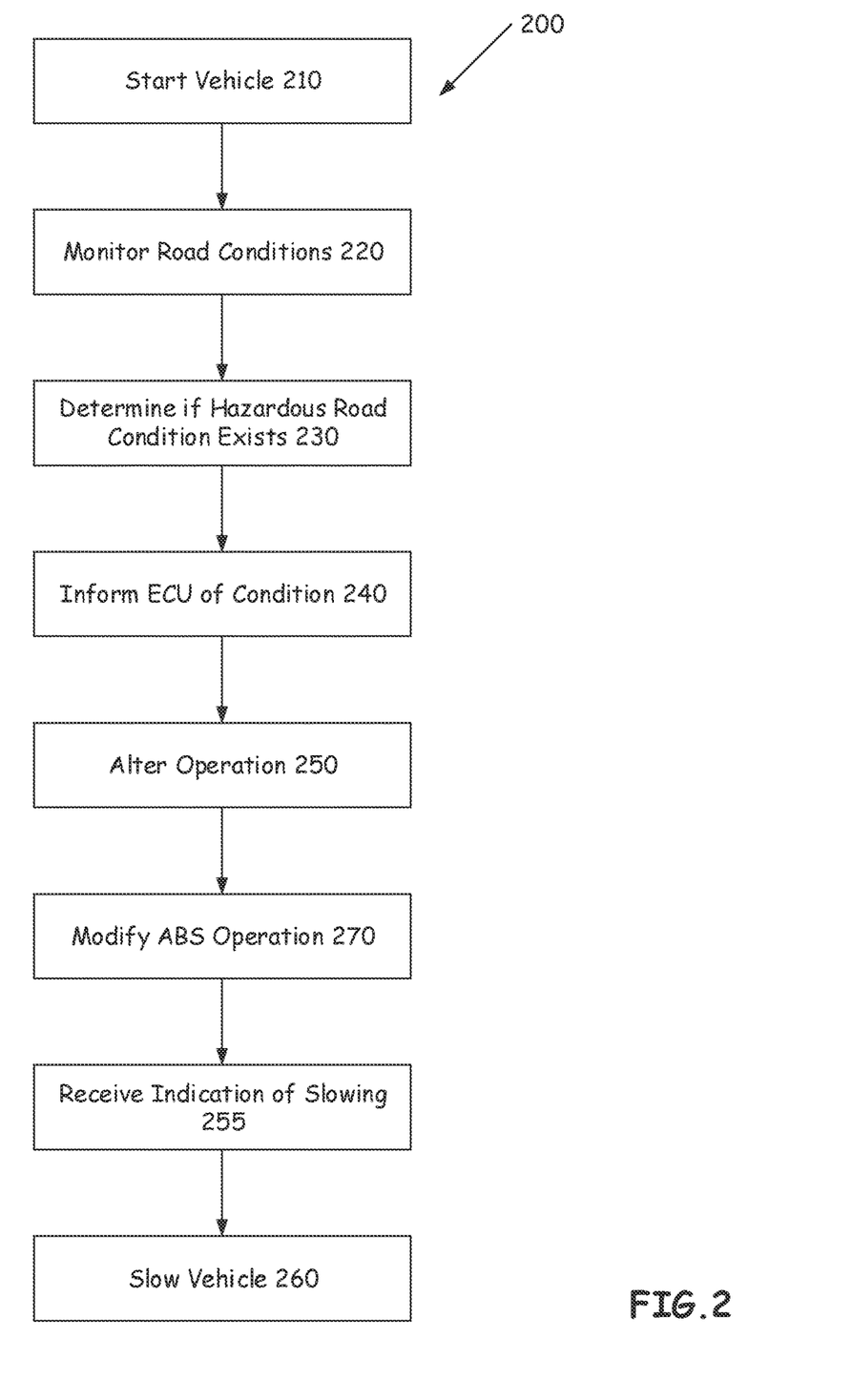
FIG. 2 is a flow diagram illustrating a process for optimizing the providing of content to users in a multi user content delivery system according to embodiments.

FIG. 2 is a flow diagram illustrating a process 200 of using an intelligent braking system 140 according to embodiments. The process begins by a driver starting a vehicle and beginning to drive down a road or highway. This is illustrated at step 210.

As the vehicle travels down the road the external road condition detector 150 monitors the road conditions. This is illustrated at step 220. The detector 150 can use sensors that are onboard the vehicle to determine the conditions of the road. For example, cameras on the vehicle can be used to determine that the road is covered with snow or is wet. In some embodiments, other sensors or systems on the car can be used to monitor the road conditions. For example, the ABS system can provide information to the detector 150 that the ABS system has engaged on a number of times, or that a stability control system can provide information that it has been used to maintain the stability of the vehicle. The detector 150 can also receive information related to the road conditions from other external sources, such as from traffic cameras, snowplow cams, other vehicles, GPS, internet sources (e.g. news, weather, traffic websites), etc. However, any information source can be used to provide information to the detector 150.

The detector 150 uses the information received about the conditions of the road to determine if a hazardous road condition exists. This is illustrated at step 230. The detector 150 can determine a hazardous road condition exists based on a comparison of the information/data received from the various sensors, systems, and sources with data from known conditions that cause hazardous road conditions. For example, data associated with snow on the road can be correlated to a hazardous road condition. This can be identified using, for example, cameras on the vehicle that indicate that the road surface is white. Other data can be compared such as, for example, that data is received from a snowplow cam which indicates that it is currently snowing (as this data would generally not be available but for it snowing), or from a weather application that provides a forecast for an area. This data can be compared to the stored data that indicates hazardous weather conditions, to determine if a hazardous road condition exists.

If a hazardous road condition is determined not to exist, the detector 150 returns to step 220 and continues to monitor the road conditions. However, if a hazardous road condition is determined to exist, the detector 150 informs the engine control unit 120 of the condition. This is illustrated at step 240.

The engine control unit 120 responds to this indication by altering its operation to account for the detected condition. This is illustrated at step 250. The engine control unit 120 can modify the way the unit responds to movement in the accelerator and/or brake pedal of the vehicle in response to an indication of a desire to slow down. The indication is illustrated at step 255. For example, the engine control unit 120 can respond to a lifting of the accelerator pedal, indicating a desire to reduce speed, by reducing fuel flow to the engine 110.

Further, the engine control unit 120 can engage the vacuum pump to increase the manifold vacuum of the engine 110. This increased manifold vacuum causes the engine 110 to work harder to maintain the same RPM. Without additional fuel to provide the power to overcome the vacuum, the engine 110 begins to slow at a rate faster than it would if only the fuel flow was reduced. This slowing of the engine 110 causes the vehicle itself to slow without the need to apply additional braking action. The slowing of the vehicle using the engine control unit 120 is illustrated at step 260.

In some embodiments, the engine control unit 120 communicates with the ABS system to indicate that the hazardous road condition exists. This indication can modify how the ABS system operates. This is illustrated at step 270. The ABS system can change its operation to minimize the use of the brakes when the engine control unit 120 has detected the hazardous condition. The ABS system can delay the application of the brakes when light brake pressure is applied to a brake pedal to allow the reduction of speed to occur through the slowing of the engine 110. Alternatively, the ABS system can allow the application of the brakes, but implement the antilocking process prior the wheels actually locking up.

Figure 3:
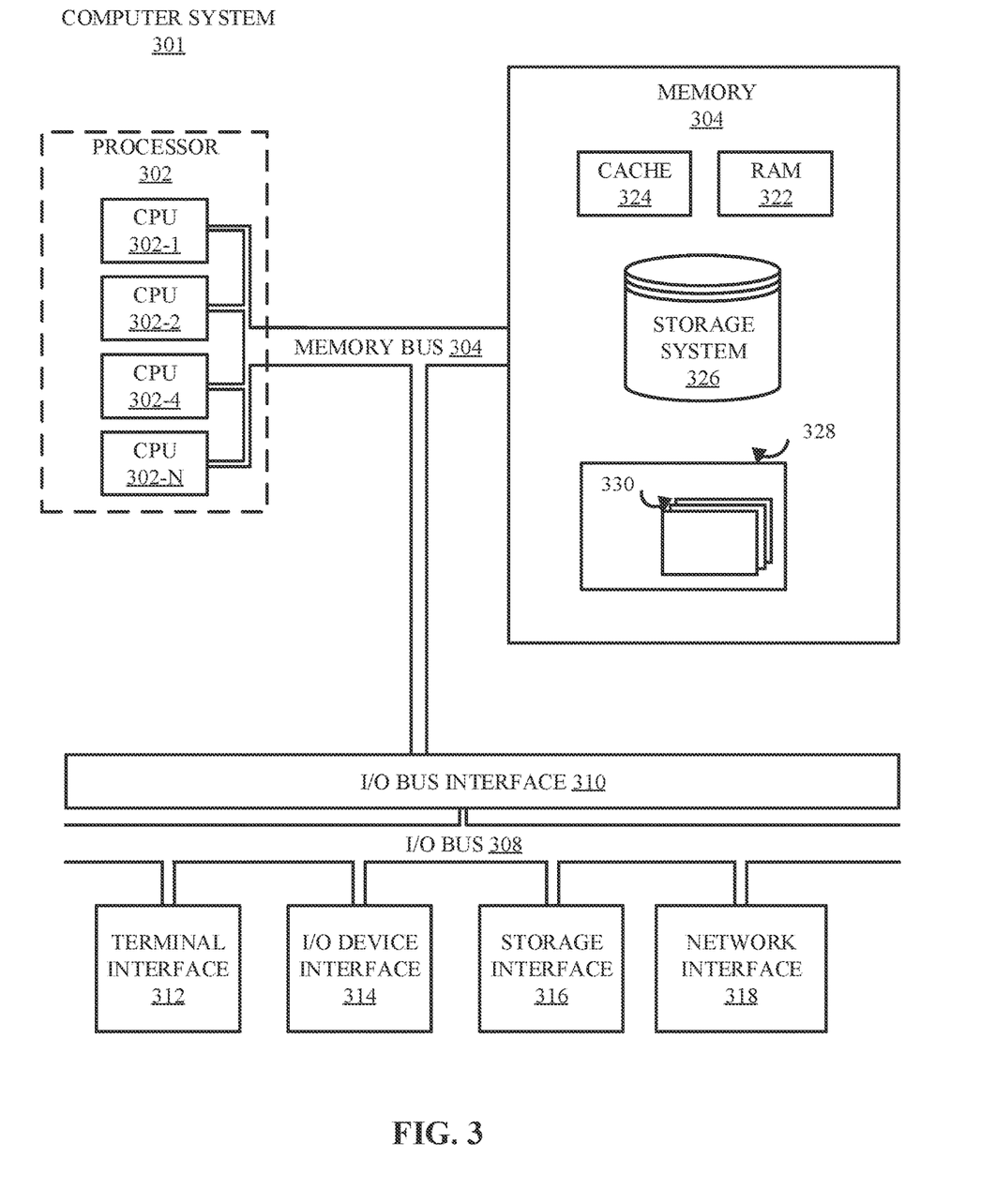
FIG. 3 is a block diagram illustrating a computing system according to one embodiment.

Referring now to FIG. 3, shown is a high-level block diagram of an example computer system 301 that may be used in implementing one or more of the methods, tools, and modules, and any related functions, described herein (e.g., using one or more processor circuits or computer processors of the computer), in accordance with embodiments of the present disclosure discussed in the FIGS. above. In some embodiments, the major components of the computer system 301 may comprise one or more CPUs 302, a memory subsystem 304, a terminal interface 312, a storage interface 316, an I/O (Input/Output) device interface 314, and a network interface 318, all of which may be communicatively coupled, directly or indirectly, for inter-component communication via a memory bus 303, an I/O bus 308, and an I/O bus interface unit 310.

The computer system 301 may contain one or more general-purpose programmable central processing units (CPUs) 302A, 302B, 302C, and 302D, herein generically referred to as the CPU 302. In some embodiments, the computer system 301 may contain multiple processors typical of a relatively large system; however, in other embodiments the computer system 301 may alternatively be a single CPU system. Each CPU 302 may execute instructions stored in the memory subsystem 304 and may include one or more levels of on-board cache.

System memory 304 may include computer system readable media in the form of volatile memory, such as random access memory (RAM) 322 or cache memory 324. Computer system 301 may further include other removable/non-removable, volatile/non-volatile computer system storage media. By way of example only, storage system 326 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 304 can include flash memory, e.g., a flash memory stick drive or a flash drive. Memory devices can be connected to memory bus 303 by one or more data media interfaces. The memory 304 may include at least one program product having a set (e.g., at least one) of program modules that are configured to carry out the functions of various embodiments.

Although the memory bus 303 is shown in FIG. 3 as a single bus structure providing a direct communication path among the CPUs 302, the memory subsystem 304, and the I/O bus interface 310, the memory bus 303 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 310 and the I/O bus 308 are shown as single respective units, the computer system 301 may, in some embodiments, contain multiple I/O bus interface units 310, multiple I/O buses 308, or both. Further, while multiple I/O interface units are shown, which separate the I/O bus 308 from various communications paths running to the various I/O devices, in other embodiments some or all of the I/O devices may be connected directly to one or more system I/O buses.

In some embodiments, the computer system 301 may be a multi-user mainframe computer system, a single-user system, or a server computer or similar device that has little or no direct user interface, but receives requests from other computer systems (clients). Further, in some embodiments, the computer system 301 may be implemented as a desktop computer, portable computer, laptop or notebook computer, tablet computer, pocket computer, telephone, smart phone, network switches or routers, or any other appropriate type of electronic device.

It is noted that FIG. 3 is intended to depict the representative major components of an exemplary computer system 301. In some embodiments, however, individual components may have greater or lesser complexity than as represented in FIG. 3, components other than or in addition to those shown in FIG. 3 may be present, and the number, type, and configuration of such components may vary.

One or more programs/utilities 328, each having at least one set of program modules 330 may be stored in memory 304. The programs/utilities 328 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 328 and/or program modules 330 generally perform the functions or methodologies of various embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
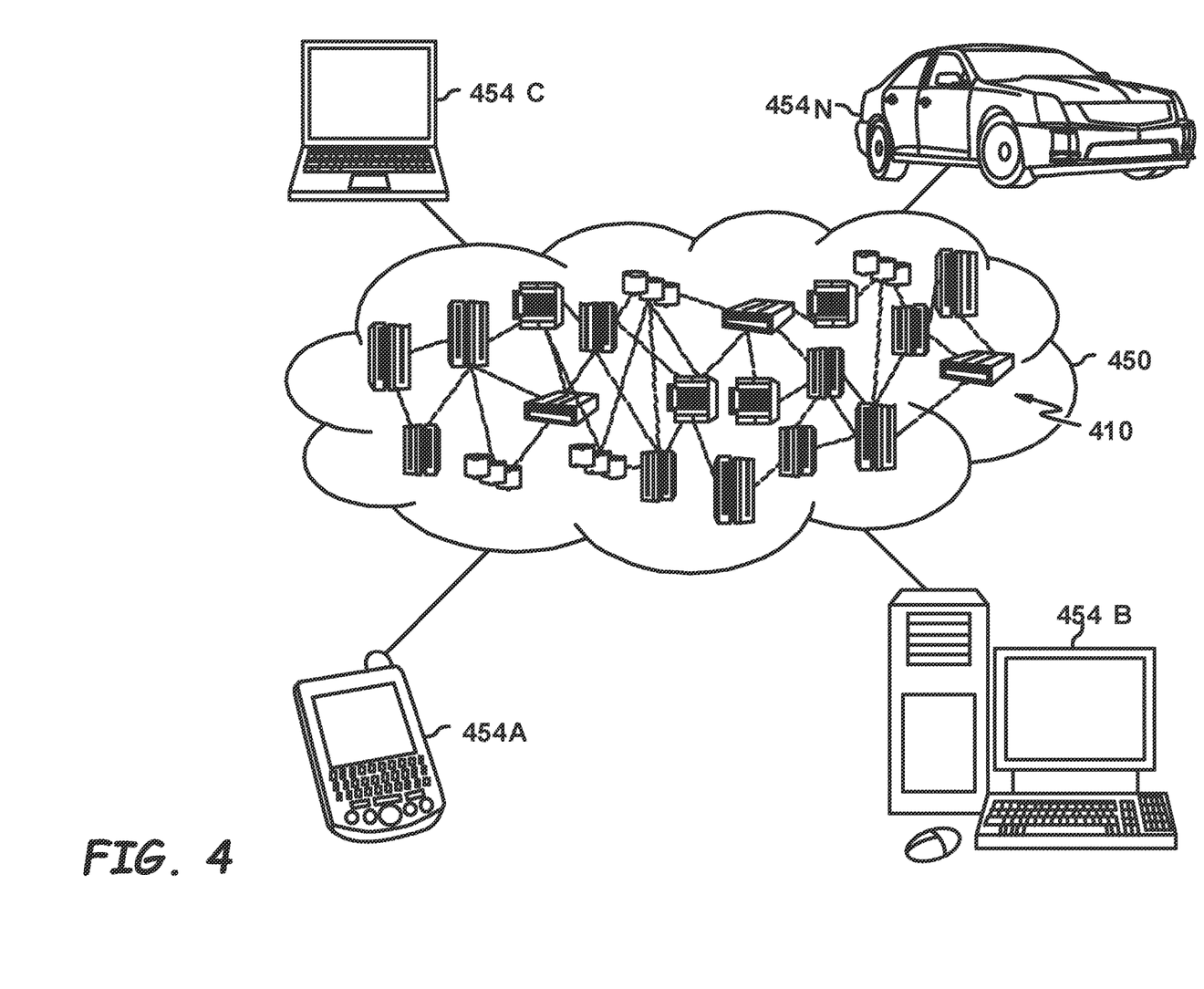
FIG. 4 is a diagrammatic representation of an illustrative cloud computing environment.

The system 100 may be employed in a cloud computing environment. FIG. 4, is a diagrammatic representation of an illustrative cloud computing environment 450 according to one embodiment. As shown, cloud computing environment 450 comprises one or more cloud computing nodes 410 with which local computing devices used by cloud consumers, such as, for example, personal digital assistant (PDA) or cellular telephone 454A, desktop computer 454B, laptop computer 454C, and/or automobile computer system 454N may communicate. Nodes 454 may communicate with one another. They may be grouped (not shown) physically or virtually, in one or more networks, such as Private, Community, Public, or Hybrid clouds as described hereinabove, or a combination thereof. This allows cloud computing environment 450 to offer infrastructure, platforms and/or software as services for which a cloud consumer does not need to maintain resources on a local computing device. It is understood that the types of computing devices 454A-N shown in FIG. 4 are intended to be illustrative only and that computing nodes 454 and cloud computing environment 450 may communicate with any type of computerized device over any type of network and/or network addressable connection (e.g., using a web browser).

Figure 5:
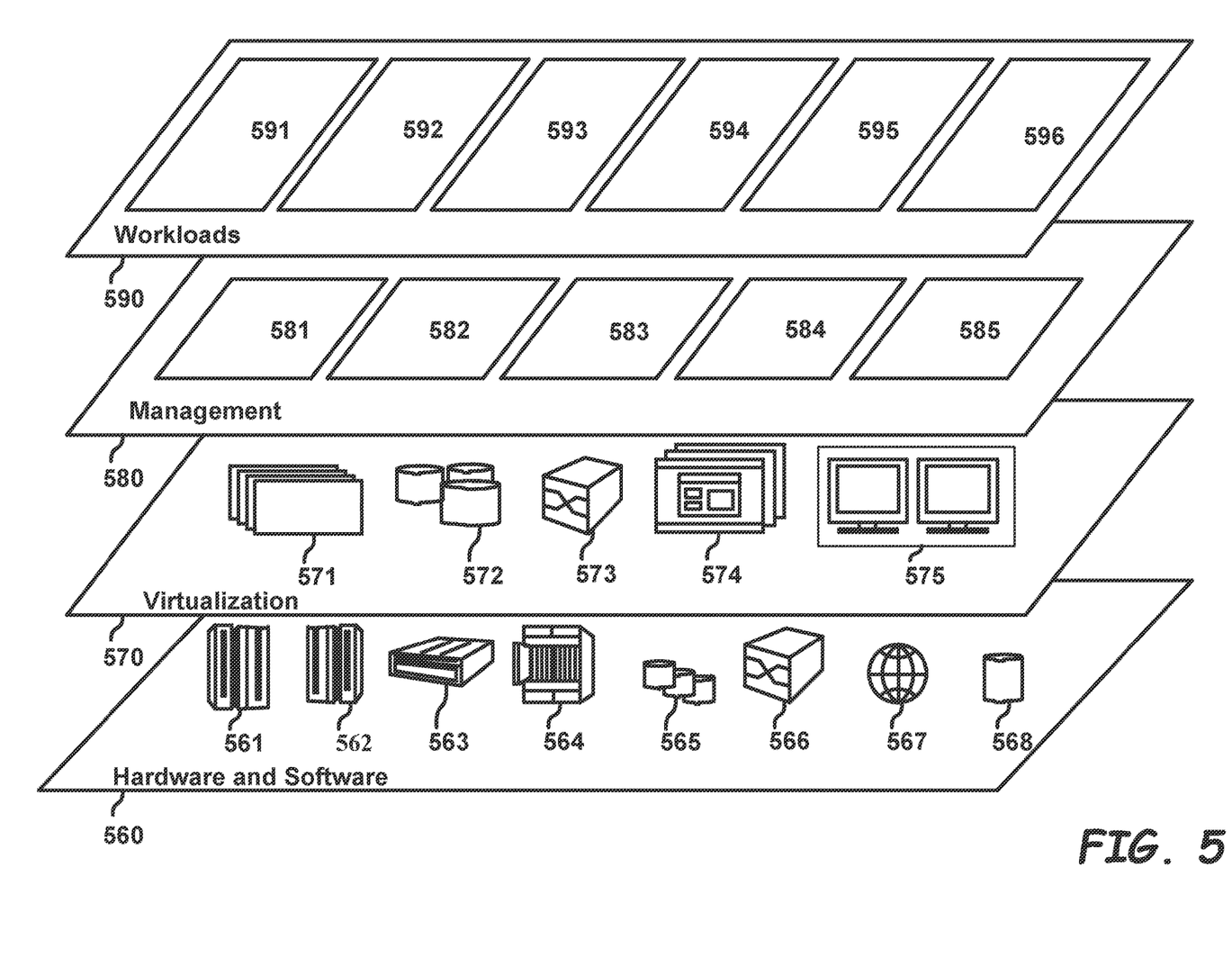
FIG. 5 illustrates a set of functional abstraction layers provided by cloud computing environment according to one illustrative embodiment.

Referring now to FIG. 5, a set of functional abstraction layers provided by cloud computing environment 450 (FIG. 4) is shown. It should be understood in advance that the components, layers, and functions shown in FIG. 5 are intended to be illustrative only and embodiments of the disclosure are not limited thereto. As depicted, the following layers and corresponding functions are provided:

Hardware and software layer 560 includes hardware and software components. Examples of hardware components include: mainframes 561; RISC (Reduced Instruction Set Computer) architecture based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities may be provided: virtual servers 571; virtual storage 572; virtual networks 573, including virtual private networks; virtual applications and operating systems 574; and virtual clients 575.

In one example, management layer 580 may provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment may be utilized. Examples of workloads and functions which may be provided from this layer include: mapping and navigation 591; software development and lifecycle management 592; content delivery and processing 593; data analytics processing 594; transaction processing 595; and database 596.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. An engine braking system for a vehicle comprising:
an engine;
an engine control unit configured to control operation of the engine;
a transmission configured to transfer rotational energy from the engine to a plurality of wheels on the vehicle;
a braking system configured to inhibit rotation of the plurality of wheels through at least one mechanical means;
an external road condition detector configured to determine road conditions in and around the vehicle; and
a vacuum system connected to the engine configured to increase a manifold vacuum associated with the engine during operation of the engine based on the determination;
wherein the vacuum system is utilized to slow the vehicle based on the determination.

2. The engine braking system of claim 1 wherein the vacuum system increases the manifold vacuum when the engine is operating at a speed above an idle speed of the engine.

3. The engine braking system of claim 1 wherein the vacuum system is engaged in response to the external road condition detector detecting a hazardous road condition.

4. The engine braking system of claim 3 wherein the vacuum system is engaged by the engine control unit.

5. The engine braking system of claim 4 wherein the engine control unit engages the vacuum system in response to a release of an accelerator in the vehicle.

6. The engine braking system of claim 1 wherein the braking system further includes an antilock braking system.

7. The engine braking system of claim 6 wherein the antilock braking system is configured to delay application of the at least one mechanical means in response to an engagement of the vacuum system.

8. The engine braking system of claim 1 wherein the engine control unit is configured to prevent additional fuel from being provided to the engine when the vacuum system is engaged.

9. The engine braking system of claim 1 wherein the external road condition detector is configured to receive road condition information via a network connection.

10. The engine braking system of claim 1 wherein the external road condition detector is configured to receive road condition information from sensors disposed on the vehicle.

11. A method of slowing a vehicle comprising:
monitoring by the vehicle road conditions;
utilizing an external road condition detector to determine road conditions;
informing an engine control unit of the road conditions;
altering operation of the engine control unit in response to the road conditions;
receiving an indication from an operator of the vehicle indicating an intent to slow down the vehicle; and
slowing the vehicle based upon the altered operation of the engine control unit by applying a vacuum to increase a manifold vacuum of an engine controlled by the engine control unit based on the determination.

12. The method of claim 11 further comprising:
delaying application of the mechanical braking system.

13. The method of claim 12 wherein delaying is performed by an anti-lock braking system.

14. The method of claim 11 wherein slowing the vehicle prevents additional fuel from being provided to the engine when the vacuum is applied.

15. The method of claim 11 wherein the vacuum is applied when the engine is operating at a speed above an idle speed of the engine.

16. The method of claim 11 wherein monitoring comprises receiving information from sensors onboard the vehicle.

17. The method of claim 11 wherein monitoring comprises receiving information from sources external from the vehicle.

18. The method of claim 11 wherein the indication is a lifting of an accelerator pedal in the vehicle.

19. A computer readable storage medium having computer executable instructions that when executed by at least one processor on a vehicle cause the at least one processor to:
inform an engine control unit of one or more road conditions in and around the vehicle determined by an external road condition detector;
alter operation of the engine control unit in response to the road conditions;
receive an indication from an operator of the vehicle indicating an intent to slow down the vehicle; and
slow the vehicle based upon the altered operation of the engine control unit by applying a vacuum to increase a manifold vacuum of an engine controlled by the engine control unit based on the determination.

* * * * *